United States Patent
Kataoka

(10) Patent No.: US 11,211,835 B2
(45) Date of Patent: Dec. 28, 2021

(54) POWER TRANSMISSION CONTROLLER, POWER RECEPTION CONTROLLER, AND METHOD FOR CONTROLLING WIRELESS POWER SUPPLY SYSTEM

(71) Applicant: ROHM CO., LTD., Kyoto (JP)

(72) Inventor: Takahiro Kataoka, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 86 days.

(21) Appl. No.: 16/654,589

(22) Filed: Oct. 16, 2019

(65) Prior Publication Data
US 2020/0127503 A1    Apr. 23, 2020

(30) Foreign Application Priority Data

Oct. 19, 2018    (JP) .............................. JP2018-197300

(51) Int. Cl.
| | | |
|---|---|---|
| *H02J 50/80* | (2016.01) | |
| *H02J 50/12* | (2016.01) | |
| *H02J 50/20* | (2016.01) | |
| *H04B 5/00* | (2006.01) | |
| *H04L 29/06* | (2006.01) | |
| *H04L 9/30* | (2006.01) | |
| *H04W 12/037* | (2021.01) | |

(52) U.S. Cl.
CPC .............. *H02J 50/80* (2016.02); *H02J 50/12* (2016.02); *H02J 50/20* (2016.02); *H04B 5/0037* (2013.01); *H04B 5/0081* (2013.01); *H04L 9/30* (2013.01); *H04L 63/0428* (2013.01); *H04W 12/037* (2021.01)

(58) Field of Classification Search
CPC .... H02J 7/00034; H02J 50/20; H04B 5/0037; H04B 5/0081; H04L 2209/80; H04L 63/0428; H04L 9/0825; H04L 9/30; H04W 12/037; Y04S 40/20
See application file for complete search history.

(56) References Cited

U.S. PATENT DOCUMENTS

| | | | | |
|---|---|---|---|---|
| 2016/0065005 A1* | 3/2016 | Won | ........................ | H02J 50/10 |
| | | | | 307/104 |
| 2017/0149291 A1* | 5/2017 | Iwasaki | .................... | H02J 7/025 |
| 2017/0346344 A1* | 11/2017 | Uchimoto | ............... | H02J 50/12 |
| 2020/0127501 A1* | 4/2020 | Song | ........................ | H02J 50/70 |

* cited by examiner

*Primary Examiner* — Jared Fureman
*Assistant Examiner* — Duc M Pham
(74) *Attorney, Agent, or Firm* — Cantor Colburn LLP

(57) ABSTRACT

There is provided a method for controlling a wireless power supply system including a wireless power transmitting device and a wireless power receiving device. The method includes: transmitting predetermined first information by non-encryption communication from a first device, which is one of the wireless power receiving device and the wireless power transmitting device, to a second device, which is the other of the wireless power receiving device and the wireless power transmitting device; transmitting the first information by encryption communication from the first device to the second device; and prohibiting, in the second device, a specific power supply mode when the first information received by the non-encryption communication does not match the first information received by the encryption communication.

15 Claims, 16 Drawing Sheets

(I)

POWER TRANSMISSION CONTROLLER, POWER RECEPTION CONTROLLER, AND METHOD FOR CONTROLLING WIRELESS POWER SUPPLY SYSTEM

CROSS-REFERENCE TO RELATED APPLICATION

This application is based upon and claims the benefit of priority from Japanese Patent Application No. 2018-197300, filed on Oct. 19, 2018, the entire contents of which are incorporated herein by reference.

TECHNICAL FIELD

The present disclosure relates to a technique for wireless power supply.

BACKGROUND

In recent years, wireless power supply to electronic apparatuses has begun to spread. In order to promote mutual use between products of different manufacturers, WPC (Wireless Power Consortium) was organized and a Qi (Chi) standard, which is the international standard, was formulated by the WPC. Wireless power supply based on the Qi standard uses electromagnetic induction between a transmitting coil and a receiving coil.

FIG. 1 is a view showing the configuration of a wireless power supply system 10 conforming to the Qi standard. The power supply system 10 includes a power transmitting device 20 (TX: Power Transmitter) and a power receiving device 30 (RX: Power Receiver). The power receiving device 30 is mounted on an electronic apparatus such as a mobile phone terminal, a smartphone, an audio player, a game device, a tablet terminal, or the like.

The power transmitting device 20 includes a transmitting coil (primary coil) 22, an inverter circuit 24, a controller 26, and a demodulator 28. The inverter circuit 24 includes an H-bridge circuit (full-bridge circuit) or a half-bridge circuit. The inverter circuit 24 applies a drive signal S1, specifically a pulse signal, to the transmitting coil 22 and causes the transmitting coil 22 to generate a power signal S2 of an electromagnetic field by a drive current flowing through the transmitting coil 22. The controller 26 generally controls the entire power transmitting device 20. Specifically, the controller 26 changes transmission power by controlling a switching frequency or switching duty ratio of the inverter circuit 24.

In the Qi standard, a communication protocol is defined between the power transmitting device 20 and the power receiving device 30, and information can be transmitted from the power receiving device 30 to the power transmitting device 20 by a control signal S3. The control signal S3 is transmitted from a receiving coil 32 (secondary coil) to the transmitting coil 22 in a form of AM (Amplitude Modulation) modulation using backscatter modulation. The control signal S3 includes, for example, power control data (also referred to as a packet) for controlling the amount of power supplied to the power receiving device 30, data indicating unique information of the power receiving device 30, and the like. The demodulator 28 demodulates the control signal S3 based on a current or voltage of the transmitting coil 22. The controller 26 controls the inverter circuit 24 based on the power control data included in the demodulated control signal S3.

The power receiving device 30 includes the receiving coil 32, a rectifying circuit 34, a smoothing capacitor 36, a modulator 38, a load 40, a controller 42, and a power supply circuit 44. The receiving coil 32 receives the power signal S2 from the transmitting coil 22 and transmits the control signal S3 to the transmitting coil 22. The rectifying circuit 34 and the smoothing capacitor 36 rectify and smooth a current S4 induced in the receiving coil 32 according to the power signal S2, and convert it into a DC voltage VRECT.

The power supply circuit 44 charges a secondary battery (not shown) using the power supplied from the power transmitting device 20, or steps up or down the DC voltage $V_RECT$ and supplies it to the controller 42 and the load 40.

The controller 42 generates power control data (also referred to as a control error packet or a CE packet) for controlling the amount of power supplied from the power transmitting device 20 so that the DC voltage $V_RECT$ approaches a target value. The modulator 38 transmits the control signal S3 to the transmitting coil 22 by modulating the coil current of the receiving coil 32 based on the control signal S3 including the power control data.

The Qi standard was originally formulated for low power consumption of 5 W or lower (BPP (Baseline Power Profile)) for mobile phone terminals, smartphones, tablet terminals, etc., and its version 1.2 supports medium power up to 15 W (EPP (Extended Power Profile)). In the future, it is expected to support high power of 120 W.

The Qi standard is widely open to the public. Therefore, power transmitting devices and power receiving devices that support the architecture of the Qi standard but have not obtained WPC authentication are currently on the market.

Devices that have not obtained WPC authentication (referred to as non-authenticated devices) are not necessarily guaranteed to be safe and reliable. If wireless power supply is performed between devices having low reliability, the devices may be damaged or other unexpected problems may occur.

SUMMARY

Some embodiments of the present disclosure provide a wireless power supply system with improved safety.

According to one embodiment of the present disclosure, there is provided a method for controlling a wireless power supply system including a wireless power transmitting device and a wireless power receiving device, including: transmitting predetermined first information by non-encryption communication from a first device, which is one of the wireless power receiving device and the wireless power transmitting device, to a second device, which is the other of the wireless power receiving device and the wireless power transmitting device; transmitting the first information by encryption communication from the first device to the second device; and prohibiting, in the second device, a specific power supply mode when the first information received by the non-encryption communication does not match the first information received by the encryption communication.

According to another embodiment of the present disclosure, there is provided a power transmission controller used in a wireless power transmitting device that transmits a power signal to a wireless power receiving device, wherein a protocol defined in a Qi standard is used to facilitate encryption communication, and a specific power supply mode is prohibited when information received from the wireless power receiving device using the encryption communication does not match an expected value.

According to further another embodiment of the present disclosure, there is provided a method for controlling a wireless power supply system including a wireless power transmitting device and a wireless power receiving device, including: transmitting predetermined information by non-encryption communication from a first device, which is one of the wireless power receiving device and the wireless power transmitting device, to a second device, which is the other of the wireless power receiving device and the wireless power transmitting device; transmitting the predetermined information by encryption communication from the second device to the first device; and prohibiting, in the first device, a specific power supply mode when the predetermined information transmitted by the non-encryption communication does not match the predetermined information received by the encryption communication.

According to still another embodiment of the present disclosure, there is provided a power reception controller used in a wireless power receiving device that receives a power signal from a wireless power transmitting device, wherein a protocol defined in a Qi standard is used to facilitate encryption communication, and a specific power supply mode is prohibited when information received from the wireless power receiving device using the encryption communication does not match an expected value.

Any combinations of the above-described elements or changes of the representations of the present disclosure between methods, apparatuses and systems are effective as embodiments of the present disclosure.

DETAILED DESCRIPTION

Figure 1:
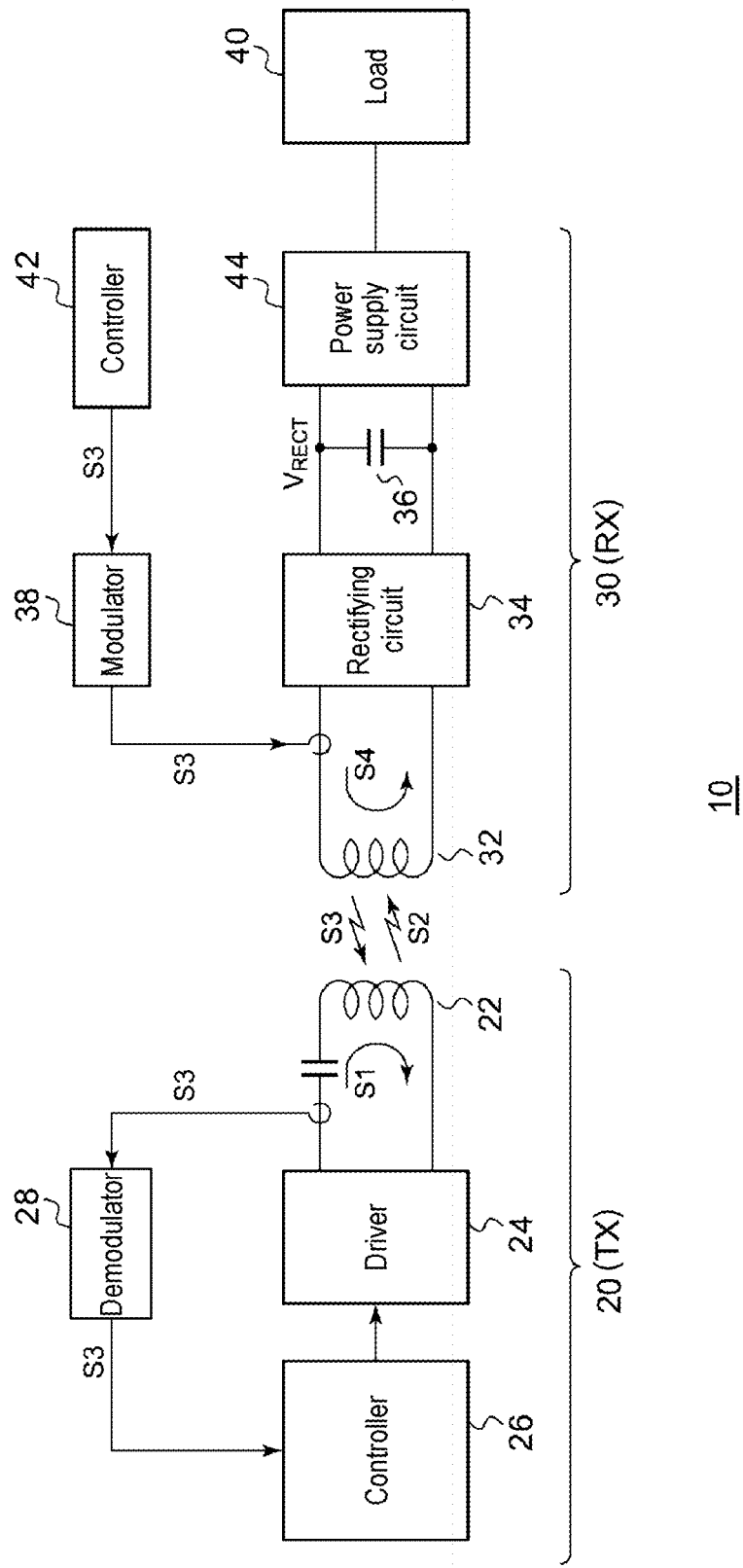
FIG. 1 is a view showing the configuration of a wireless power supply system conforming to the Qi standard.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair functions and effects achieved by combinations of the members A and C or the members B and C, in addition to a case where the member A and the member C or the member B and the member C are directly connected.

The flowcharts and sequence diagrams referred to in the present disclosure do not limit the order of processes shown therein. The order of processes shown in the flowcharts and sequence diagrams can be changed unless contradictory, and some processes may be executed simultaneously in parallel.

First Embodiment

Figure 2:
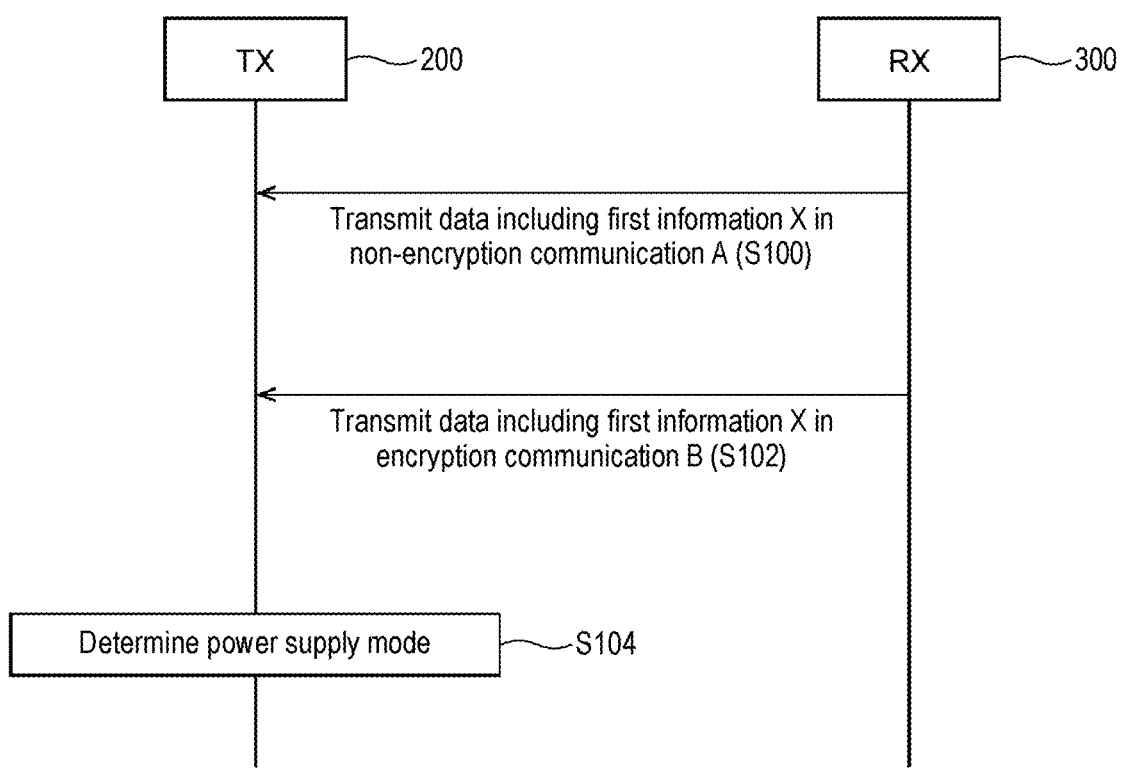
FIG. 2 is a flowchart of mode control of a wireless power supply system according to a first embodiment.

FIG. 2 is a flowchart of mode control of a wireless power supply system 100 according to a first embodiment. The wireless power supply system 100 includes a power transmitting device TX (200) and a power receiving device RX (300). One of the power transmitting device TX and the power receiving device RX is referred to as a first device and the other is referred to as a second device. In the example of FIG. 2, the power receiving device RX is the first device and the power transmitting device TX is the second device. For example, the power transmitting device TX and the power receiving device RX are assumed to support a communication protocol defined in the Qi standard and further support encryption communication.

Data including predetermined first information X is transmitted from the first device RX, which is one of the power transmitting device TX and the power receiving device RX, to the second device TX, which is the other of the power transmitting device TX and the power receiving device RX, by non-encryption communication A (S100). The first information X can use one of several pieces of information to be transmitted from the power receiving device RX to the power transmitting device TX in the Digital Ping phase in the Qi standard, in which case the process S100 proceeds to the Digital Ping phase. As an example, the first information X can use an ID (RxID in the Qi standard) unique to the first device RX.

Further, the data including the same first information is transmitted from the first device RX to the second device TX by encryption communication B (S102).

Then, in the second device TX, a power supply mode is determined based on the first information X included in the data received by the non-encryption communication A and the first information X' included in the data received by the encryption communication B (S104). When the second device TX supports several power supply modes having different powers, if X and X' do not match, an operation in a predetermined power supply mode (for example, a power supply mode with high power) is prohibited.

Figure 3:
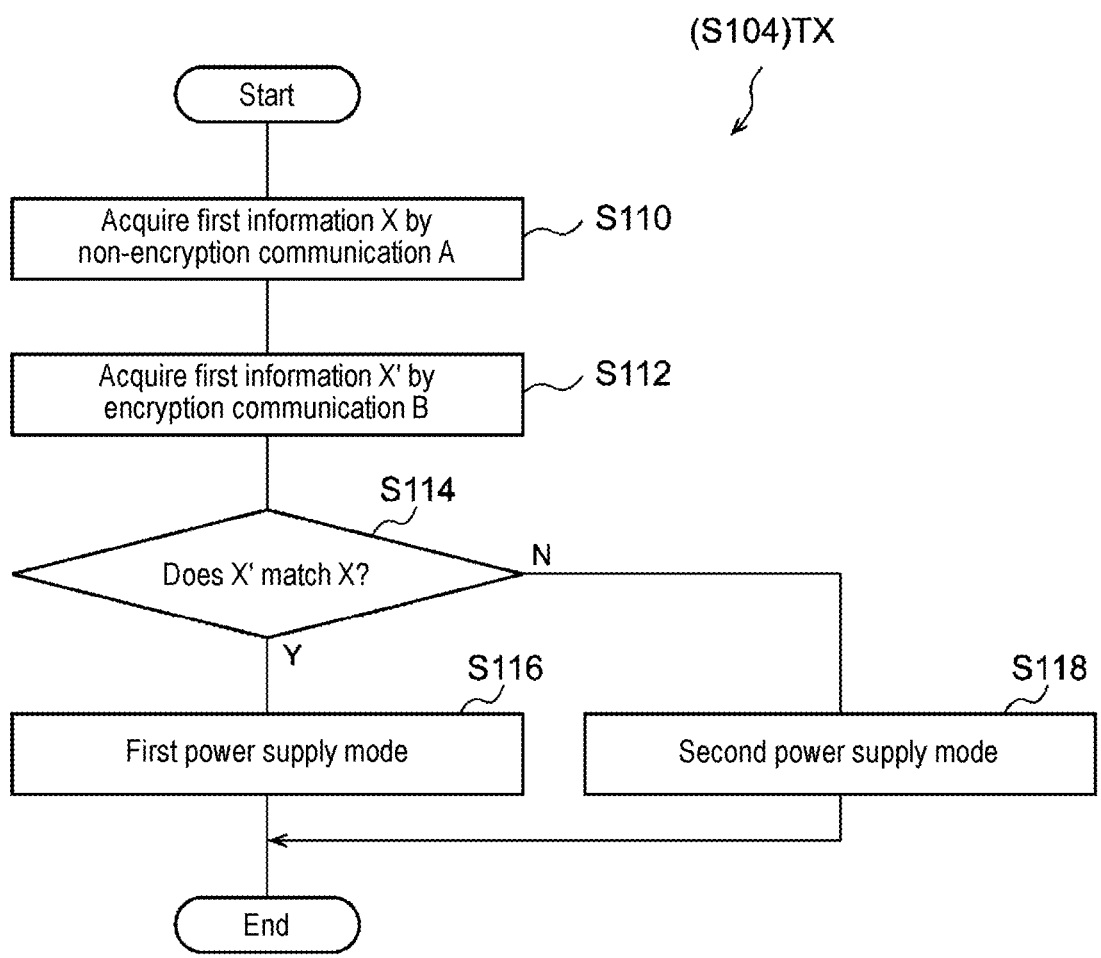
FIG. 3 is a flowchart of determination of a power supply mode in a second device TX.

FIG. 3 is a flowchart of determination of a power supply mode in the second device TX (S104 in FIG. 2). The second device TX acquires the first information X by the non-encryption communication A (S110). Further, the second device TX decrypts the received data of the encryption communication B to acquire the first information X' (S112). When the encryption communication between the first device RX and the second device TX is successful, the first information X' matches the first information X. The second device TX compares X and X' (S114). When they match (Y in S114), the second device TX selects a first power supply mode (S116). When they do not match (N in S114), the second device TX selects a second power supply mode (S118). The first power supply mode is a mode with relatively high power and may be an EPP mode. The second power supply mode is a mode with relatively low power and may be a BPP mode.

Figure 4:
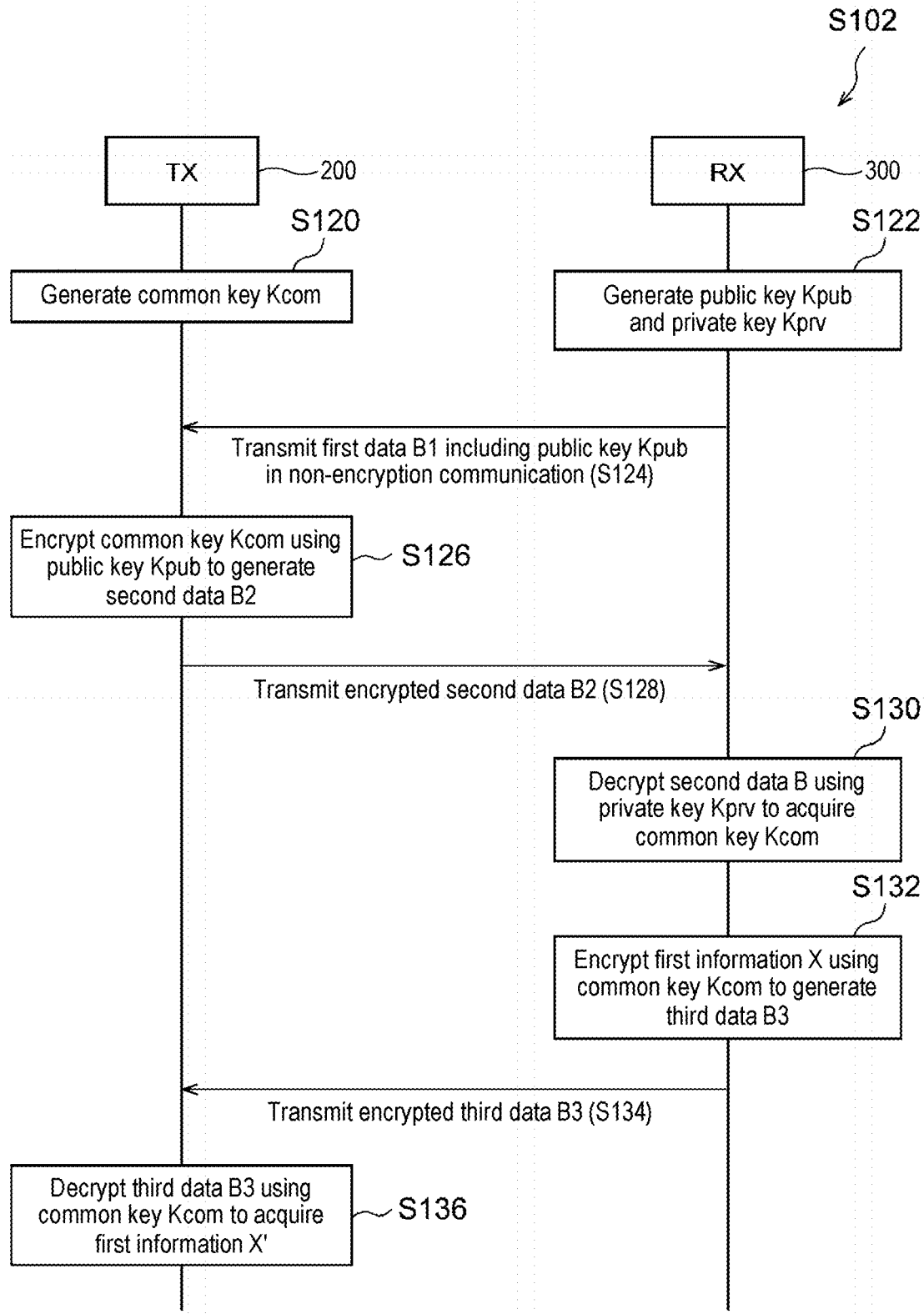
FIG. 4 is a sequence diagram of encryption communication between a first device RX and the second device TX.

FIG. 4 is a sequence diagram of the encryption communication B between the first device RX and the second device TX. In the second device TX, a common key Kcom is generated (S120). In the first device RX, a public key Kpub and a private key Kprv paired therewith are generated (S122). A random number generated for each negotiation between the second device TX and the first device RX can be used for the public key Kpub. Alternatively, a random public key Kpub may be stored for each device.

Then, first data B1 including the public key Kpub is transmitted from the first device RX to the second device TX by the non-encryption communication (S124).

The second device TX encrypts the common key Kcom generated in S120 using the public key Kpub received in S124 to generate second data B2 (S126). Then, the second data B2 is transmitted to the first device RX (S128).

In the first device RX, the private key Kprv generated in S122 is used to decrypt the second data B2 and extract the common key Kcom (S130). In this step, the common key Kcom is shared between the first device RX and the second device TX.

Then, in the first device RX, the common key Kcom is used to encrypt the first information X to generate third data B3 (S132). Then, the third data B3 is transmitted from the first device RX to the second device TX (S134).

The second device TX decrypts the third data B3 using the common key Kcom to acquire the first information X' (S136).

The above is the control method of the power supply system 100. According to the power supply system 100, the second device TX cannot acquire the first information X' that matches the correct first information X unless both the power transmitting device 200 and the power receiving device 300 support the same encryption communication.

Unless information related to encryption communication used for hardware or software included in each of the power transmitting device 200 and the power receiving device 300 is published, a specific power supply mode can be permitted only by a combination of hardware or software provided by the same vendor.

For example, assume that a vendor A provides a TX side controller TX_CONT_A (and software) and an RX side controller RX_CONT_A (and software) corresponding to the Qi standard. These controllers TX_CONT_A and RX_CONT_A can only transmit and receive the first information X by the non-encryption communication.

On the other hand, assume that a vendor B provides a TX side controller TX_CONT_B and an RX side controller RX_CONT_B (and software) that correspond to the Qi standard and have a function related to transmission/reception of the first information X' by the above-described secret communication. These controllers TX_CONT_B and RX_CONT_B naturally support transmission/reception of the first information X by the non-encryption communication.

In such a situation, a power receiving device including the controllers RX_CONT_A and RX_CONT_B and a power transmitting device including the controllers TX_CONT_A and RX_CONT_B are widely spread in the market.

Power supply with large power can be permitted only between a power transmitting device including the controller TX_CONT_B and a power receiving device including the controller RX_CONT_B, and power supply with large power can be prohibited between a power transmitting device including the controller TX_CONT_B and a power receiving device including the controller RX_CONT_A and between a power transmitting device including the controller TX_CONT_A and a power receiving device including the controller RX_CONT_B.

In this situation, devices that support the Qi standard and obtain authentication (regular devices) and devices that support the Qi standard and do not obtain authentication (non-regular devices) are distributed in the market, and some of the non-regular devices have low reliability. On the other hand, in the Qi standard, a regular device and a non-regular device cannot be distinguished from each other.

Even if the secret communication according to the embodiment is introduced, it is not possible to distinguish between a regular device and a non-regular device, but at least power supply with large power can be permitted only between devices including a controller provided by the same vendor, thereby improving safety and reliability.

Next, a configuration example of the power transmitting device TX and the power receiving device RX will be described.

Figure 5:
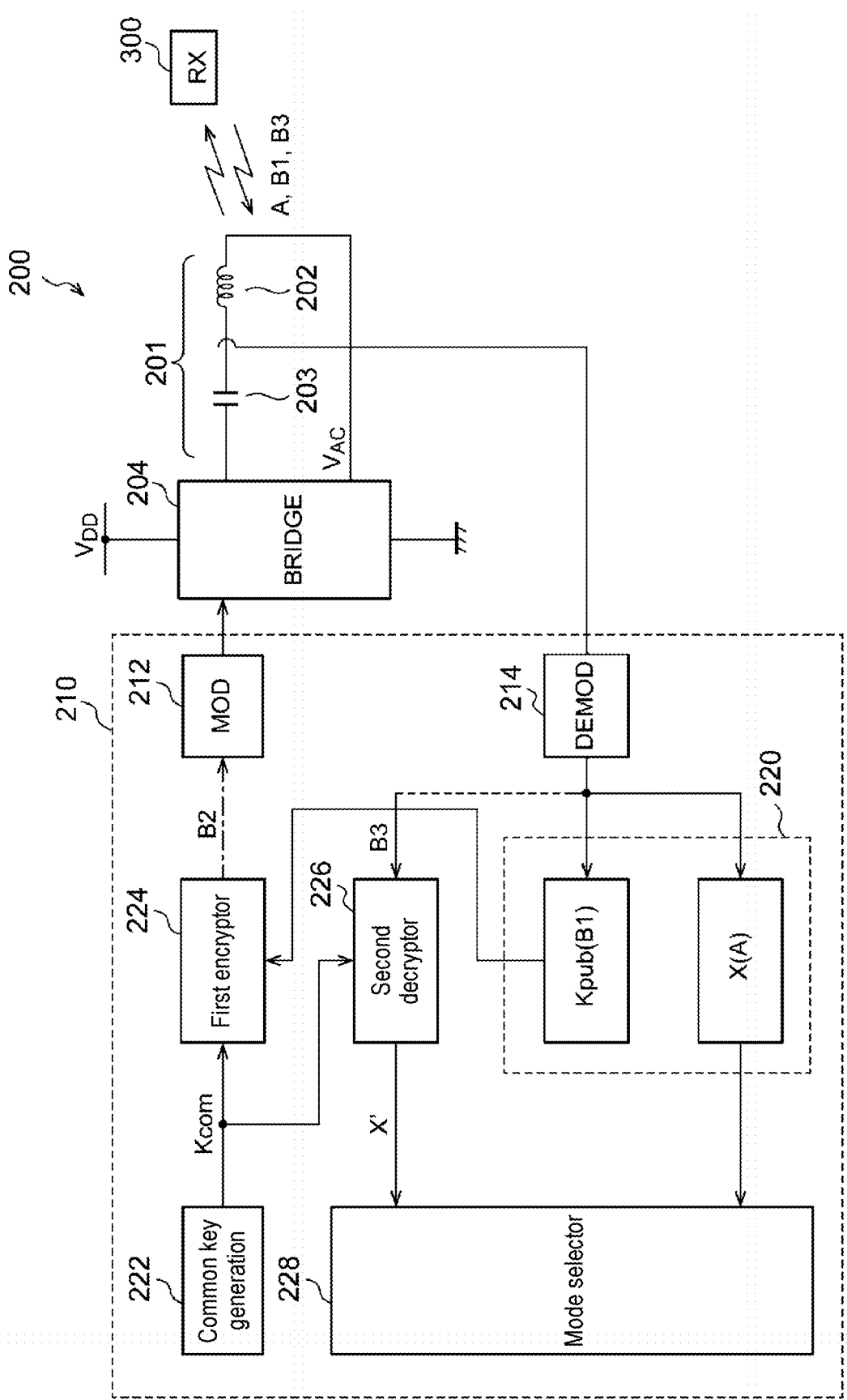
FIG. 5 is a block diagram of a power transmitting device.

FIG. 5 is a block diagram of the power transmitting device 200. The power transmitting device 200 includes a transmitting antenna 201, an inverter circuit 204, and a power transmission controller 210. The transmitting antenna 201 includes a transmitting coil 202 and a resonance capacitor 203 connected in series. The inverter circuit 204 includes a half-bridge circuit or a full-bridge circuit, converts a DC voltage $V_{DD}$ into an AC voltage $V_{AC}$, and applies the AC voltage $V_{AC}$ to the transmitting antenna 201.

The power transmission controller 210 generally controls the power transmitting device 200. The power transmission controller 210 may be configured by a single IC (Integrated Circuit) or may be a combination of several ICs. Further, some or all of the functions of the power transmission controller 210 may be implemented by software control. In this case, the power transmission controller 210 may be a microcomputer including a processor. It is understood that each block included in the power transmission controller 210 does not necessarily correspond to a unit of hardware but merely represents a function.

A modulator 212 modulates a coil current flowing through the transmitting antenna 201 according to input data to be transmitted. The modulation scheme is defined in the Qi standard. A demodulator 214 monitors a current (or voltage) flowing through the transmitting antenna 201 and demodulates the data A, B1, and B3 transmitted from the power receiving device 300.

A memory 220 holds data. Specifically, the memory 220 stores the public key Kpub included in the first data B1 received from the power receiving device 300 and the first information X acquired by the non-encryption communication A.

A key generator 222 generates the common key Kcom. The common key Kcom may use the same value every time, but preferably uses a random number generated at each negotiation.

A first encryptor 224 uses the public key Kpub to encrypt the common key Kcom to generate the second data B2. The second data B2 is modulated by the modulator 212 and transmitted to the power receiving device 300.

A second decryptor 226 uses the common key Kcom to decrypt the third data B3 received from the power receiving device 300 to extract the first information X'.

A mode selector 228 compares the first information X' with the first information X dand selects a mode.

Figure 6:
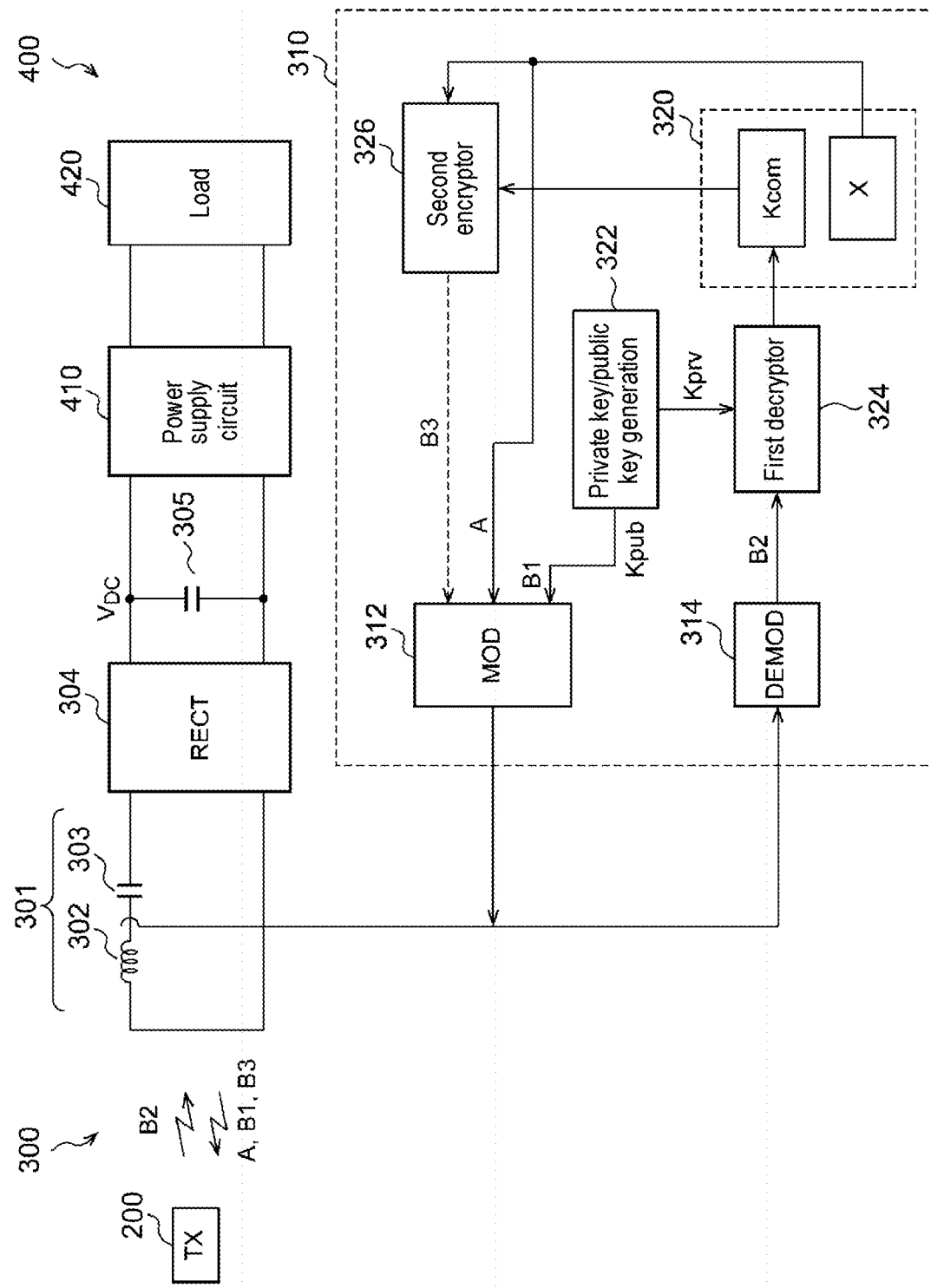
FIG. 6 is a block diagram of a power receiving device.

Subsequently, the configuration of the power receiving device 300 paired with the power transmitting device 200 of FIG. 5 will be described. FIG. 6 is a block diagram of the power receiving device 300. The power receiving device 300 includes a receiving antenna 301, a rectifier 304, a smoothing capacitor 305, and a power reception controller 310. The power receiving device 300 is mounted on an electronic apparatus 400 such as a smartphone or a tablet terminal. A DC voltage $V_{DC}$ generated in the smoothing capacitor 305 is converted by a power supply circuit 410 into an appropriate voltage level, and is supplied to a load circuit 420.

The receiving antenna 301 includes a receiving coil 302 and a resonance capacitor 303 connected in series. The rectifier 304 rectifies a current flowing through the receiving antenna 301. The DC voltage $V_{DC}$ is generated in the smoothing capacitor 305.

The power reception controller 310 generally controls the power receiving device 300. The power reception controller 310 may be configured by a single IC (Integrated Circuit) or may be a combination of several ICs. Further, some or all of the functions of the power reception controller 310 may be implemented by software control. In this case, the power reception controller 310 may be a microcomputer including a processor. It is understood that each block included in the power reception controller 310 does not necessarily correspond to a unit of hardware but merely represents a function.

A modulator 312 modulates a coil current flowing through the receiving antenna 301 according to input data to be transmitted, and transmits the data A, B1, and B3. The modulation scheme is defined in the Qi standard. A demodulator 314 monitors a current (or voltage) flowing through the receiving antenna 301 and demodulates the data transmitted from the power receiving device 300.

A memory 320 holds data. Specifically, the memory 320 stores the first information X to be transmitted to the power transmitting device 200. The first information X is input to the modulator 312 and transmitted to the power transmitting device 200 by the non-encryption communication A.

A key generator 322 generates a private key Kprv and a public key Kpub. The public key Kpub is input to modulator 312 and transmitted to the power transmitting device 200 as the first data B1.

The demodulator 314 demodulates the second data B2 from the power transmitting device 200. A first decryptor 324 corresponds to and has the same architecture as the first encryptor 224 built in the power transmission controller 210. The first decryptor 324 uses the private key Kprv to decrypt the second data B2 and extract the common key Kcom from the second data B2. The common key Kcom is stored in the memory 320.

A second encryptor 326 corresponds to and has the same architecture as the second decryptor 226 built in the power transmission controller 210. The second encryptor 326 uses the common key Kcom to encrypt the first information X and generate the third data B3. The third data B3 is input to the modulator 312 and transmitted to the power transmitting device 200.

Note that the configurations of the power transmitting device 200 in FIG. 5 and the power receiving device 300 in FIG. 6 are examples, and it should be understood by those skilled in the art that various modifications can be made.

Second Embodiment

Figure 7:
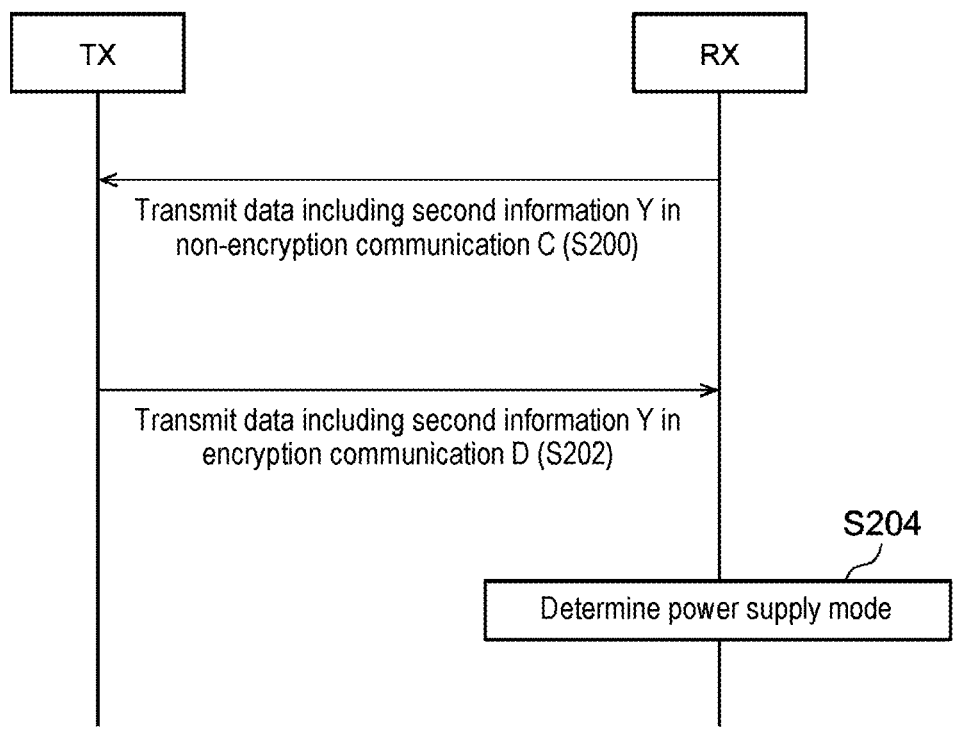
FIG. 7 is a flowchart of mode control of a wireless power supply system according to a second embodiment.

FIG. 7 is a flowchart of mode control of a wireless power supply system 100 according to a second embodiment. In the second embodiment, one of the power transmitting device TX and the power receiving device RX is a first device, and the other is a second device. In FIG. 7, the power receiving device RX is the first device and the power transmitting device TX is the second device. As the first embodiment, the power transmitting device TX and the power receiving device RX support a communication protocol defined in the Qi standard and further support encryption communication.

Predetermined second information Y is transmitted by non-encryption communication C from the first device RX, which is one of the power transmitting device TX and the power receiving device RX, to the second device TX, which is the other of them (S200). The second information Y can use one of several pieces of information to be transmitted from the power receiving device RX to the power transmitting device TX in the Digital Ping phase in the Qi standard, in which case the process S200 proceeds to the Digital Ping phase. As an example, an SS (Signal Strength) value can be used for the second information Y. Alternatively, RxID may be used as the second information Y.

Further, the second device TX encrypts the second information Y received in S200 and transmits it to the first device RX by encryption communication D (S202).

Then, in the first device RX, a power supply mode is determined based on the second information Y transmitted in the non-encryption communication C and second information Y' included in the data received by the encryption communication D (S204). When the second device TX supports several power supply modes with different powers, if Y and Y' do not match, an operation in a predetermined power supply mode (for example, a power supply mode with high power) is prohibited.

Figure 8:
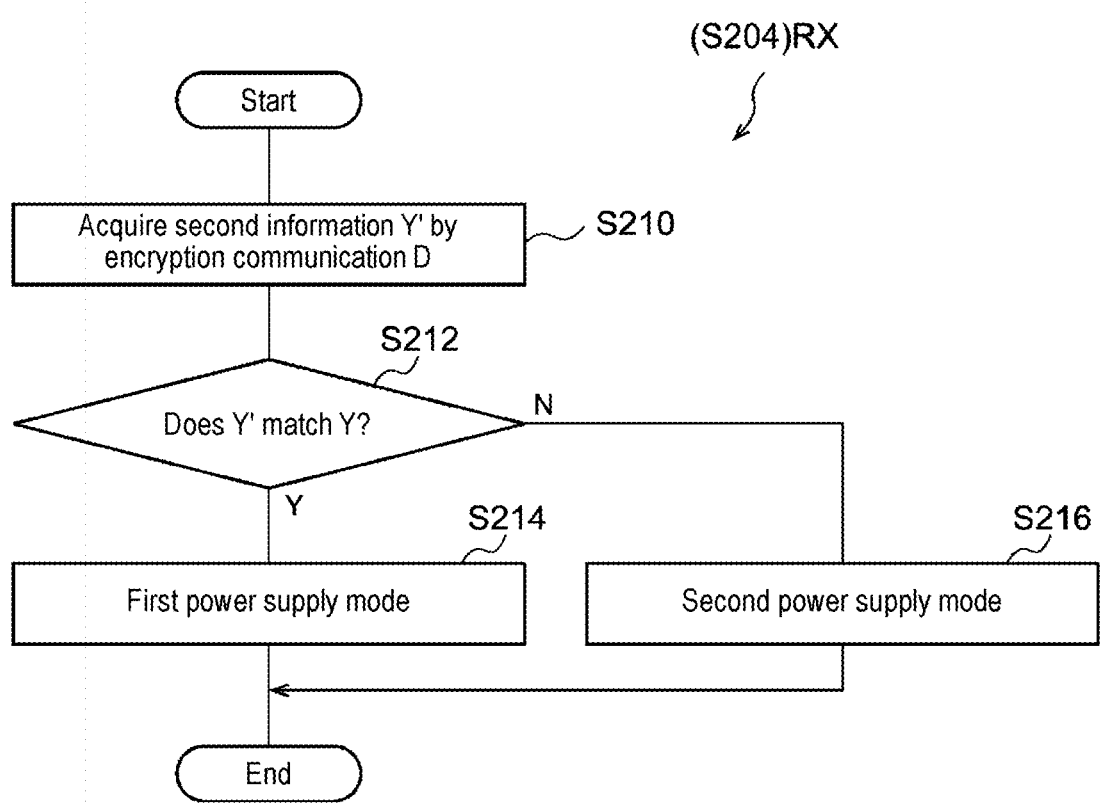
FIG. 8 is a flowchart for determination of a power supply mode in a first device RX.

FIG. 8 is a flowchart of determination of a power supply mode in the first device RX (S204 in FIG. 7). The first device RX acquires the second information Y' by the encryption communication D (S210). When the encryption communication between the first device RX and the second device TX is successful, the second information Y' matches the second information Y that has already been transmitted. The first device RX compares the second information Y and the second information Y' (S212). When they match (Y in S212), the first device RX selects a first power supply mode (S214). When they do not match (N in S212), the first device RX selects a second power supply mode (S216). The first power supply mode is a mode with relatively high power and may be an EPP mode. The second power supply mode is a mode with relatively low power and may be a BPP mode.

Figure 9:
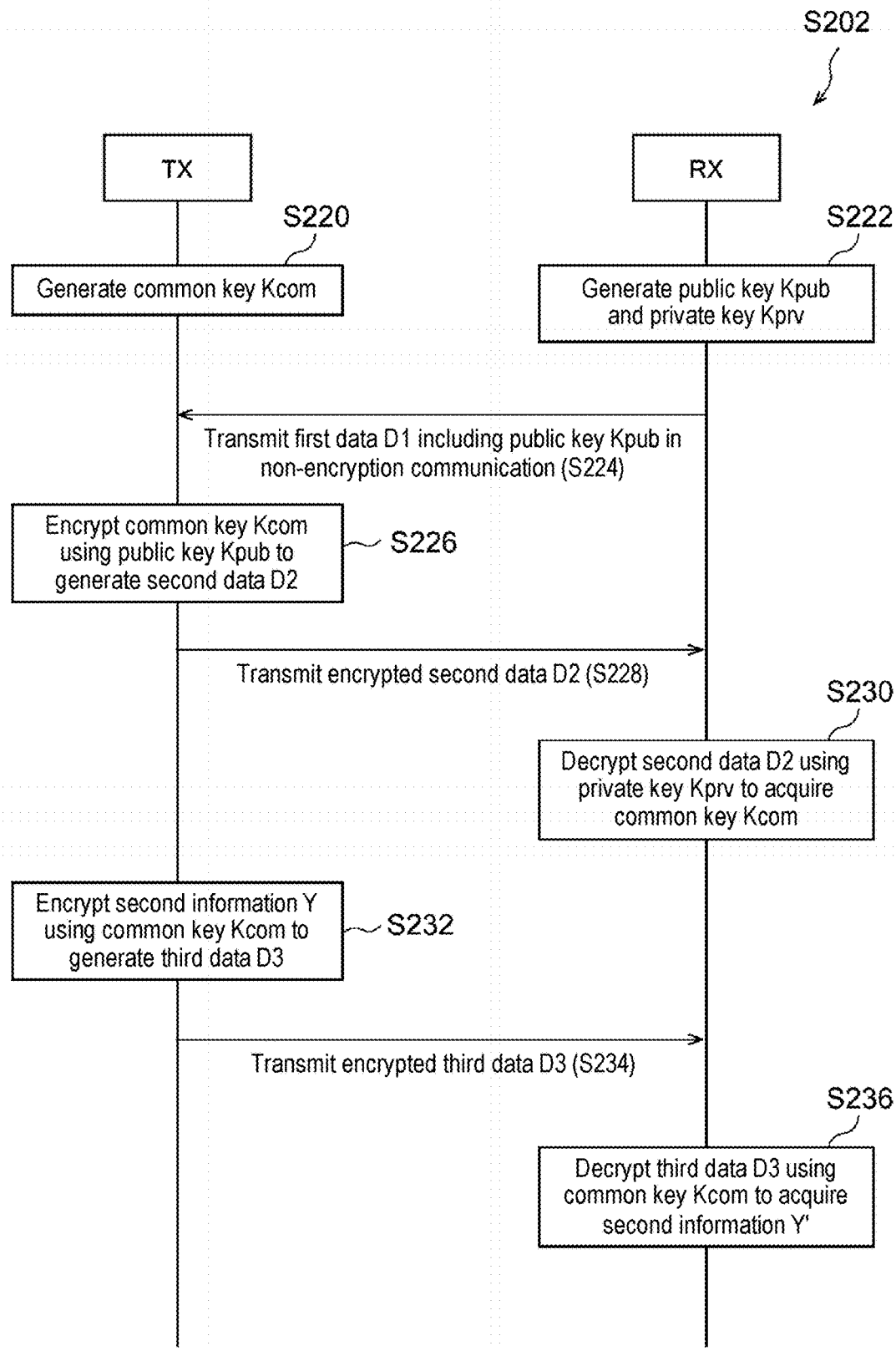
FIG. 9 is a sequence diagram of encryption communication between the first device RX and a second device TX.

FIG. 9 is a sequence diagram of the encryption communication D between the first device RX and the second device TX. In the second device TX, a common key Kcom is generated (S220). In the first device RX, a public key Kpub and a private key Kprv paired therewith are generated (S222). As the public key Kpub, a random number generated for each negotiation between the second device TX and the first device RX can be used. Alternatively, a random public key Kpub may be stored for each device.

Then, first data D1 including the public key Kpub is transmitted from the first device RX to the second device TX by the non-encryption communication (S224).

The second device TX uses the public key Kpub received in S224 to encrypt the common key Kcom generated in S220 and generate second data D2 (S226). Then, the second data D2 is transmitted to the first device RX (S228).

In the first device RX, the private key Kprv generated in S222 is used to decrypt the second data D2 and extract the common key Kcom (S230). In this step, the common key Kcom is shared between the first device RX and the second device TX.

Then, in the second device TX, the common key Kcom is used to encrypt the second information Y received by the non-encryption communication C to generate third data D3 (S232). Then, the third data D3 is transmitted from the second device TX to the first device RX (S234).

The first device RX uses the common key Kcom to decrypt the third data D3 and acquire the second information Y' (S236).

The above is the control method of the power supply system 100. According to the power supply system 100, the first device RX cannot acquire the second information Y' that matches the correct second information Y unless both the power transmitting device 200 and the power receiving device 300 support the same encryption communication.

Unless information related to encryption communication used for hardware or software included in each of the power transmitting device 200 and the power receiving device 300 is published, a specific power supply mode can be permitted only by a combination of hardware or software provided by the same vendor.

Subsequently, a configuration example of the power transmitting device TX and the power receiving device RX will be described.

Figure 10:
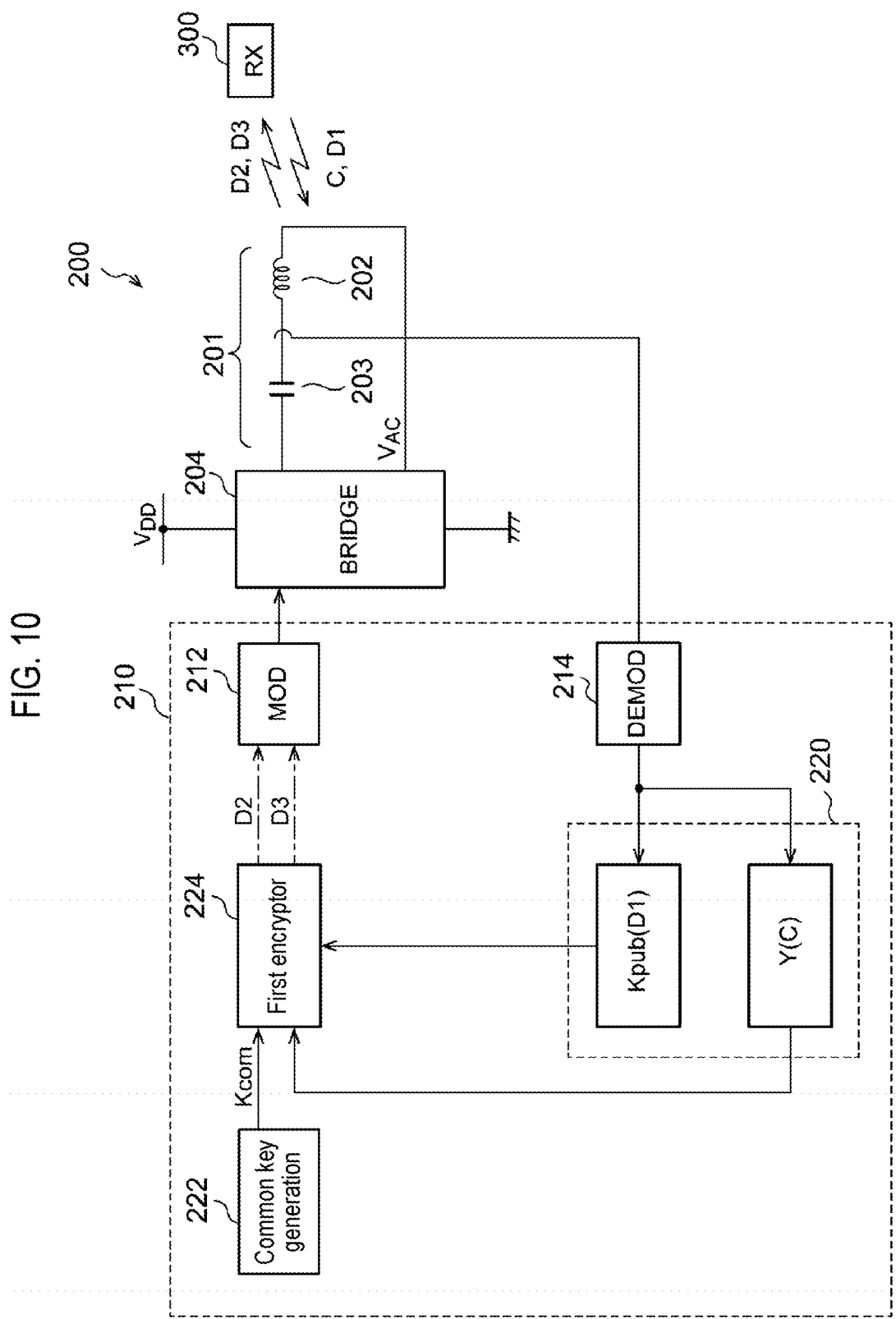
FIG. 10 is a block diagram of a power transmitting device.

FIG. 10 is a block diagram of the power transmitting device 200. The power transmitting device 200 includes a transmitting antenna 201, an inverter circuit 204, and a power transmission controller 210.

A demodulator 214 stores the second information Y received by the non-encryption communication C in a memory 220. The demodulator 214 stores the public key Kpub included in the first data D1 in the memory 220. A first encryptor 224 uses the public key Kpub to encrypt the common key Kcom and generate second data D2. The first encryptor 224 uses the public key Kpub to encrypt the second information Y in the memory 220 and generate third data D3.

Figure 11:
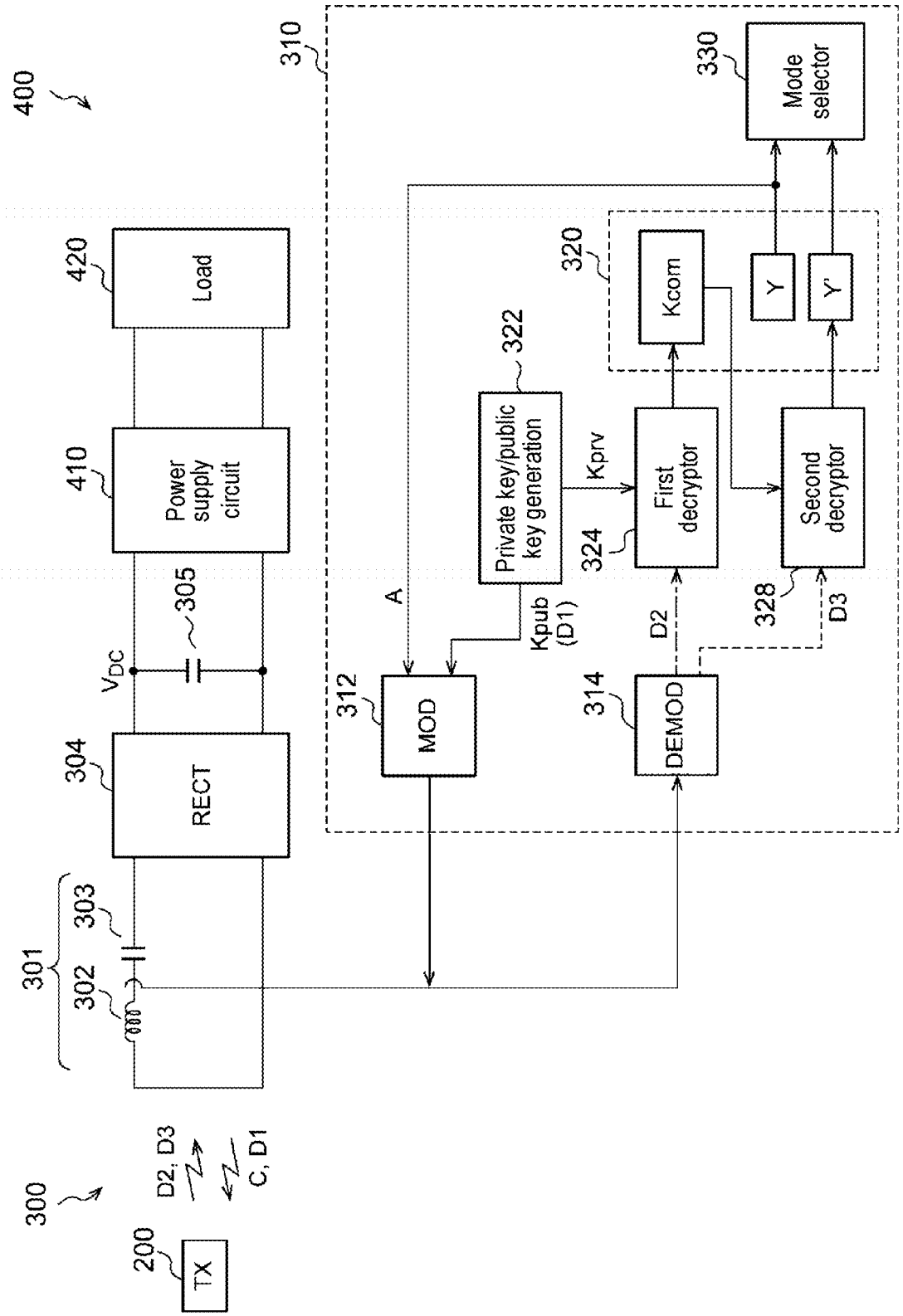
FIG. 11 is a block diagram of a power receiving device.

Subsequently, the configuration of the power receiving device 300 paired with the power transmitting device 200 of FIG. 10 will be described. FIG. 11 is a block diagram of the power receiving device 300.

A modulator 312 receives the second information Y and transmits it to the power transmitting device 200 by the non-encryption communication C. Further, the modulator 312 receives the first data D1 including the public key Kpub generated by the key generator 322 and transmits it to the power transmitting device 200.

In addition, the demodulator 314 receives the second data D2 and the third data D3 from the power transmitting device 200. The first decryptor 324 uses the private key Kprv to decrypt the second data D2, extract the common key Kcom, and store the common key Kcom in a memory 320. A second decryptor 328 uses the common key Kcom to decrypt the third data D3 and extract the second information Y'.

A mode selector 330 compares the previously transmitted second information Y with the returned second information Y' and determines a mode based on the comparison result.

Note that the configurations of the power transmitting device 200 in FIG. 10 and the power receiving device 300 in FIG. 11 are examples, and it should be understood by those skilled in the art that various modifications can be made.

Third Embodiment

Figure 12:
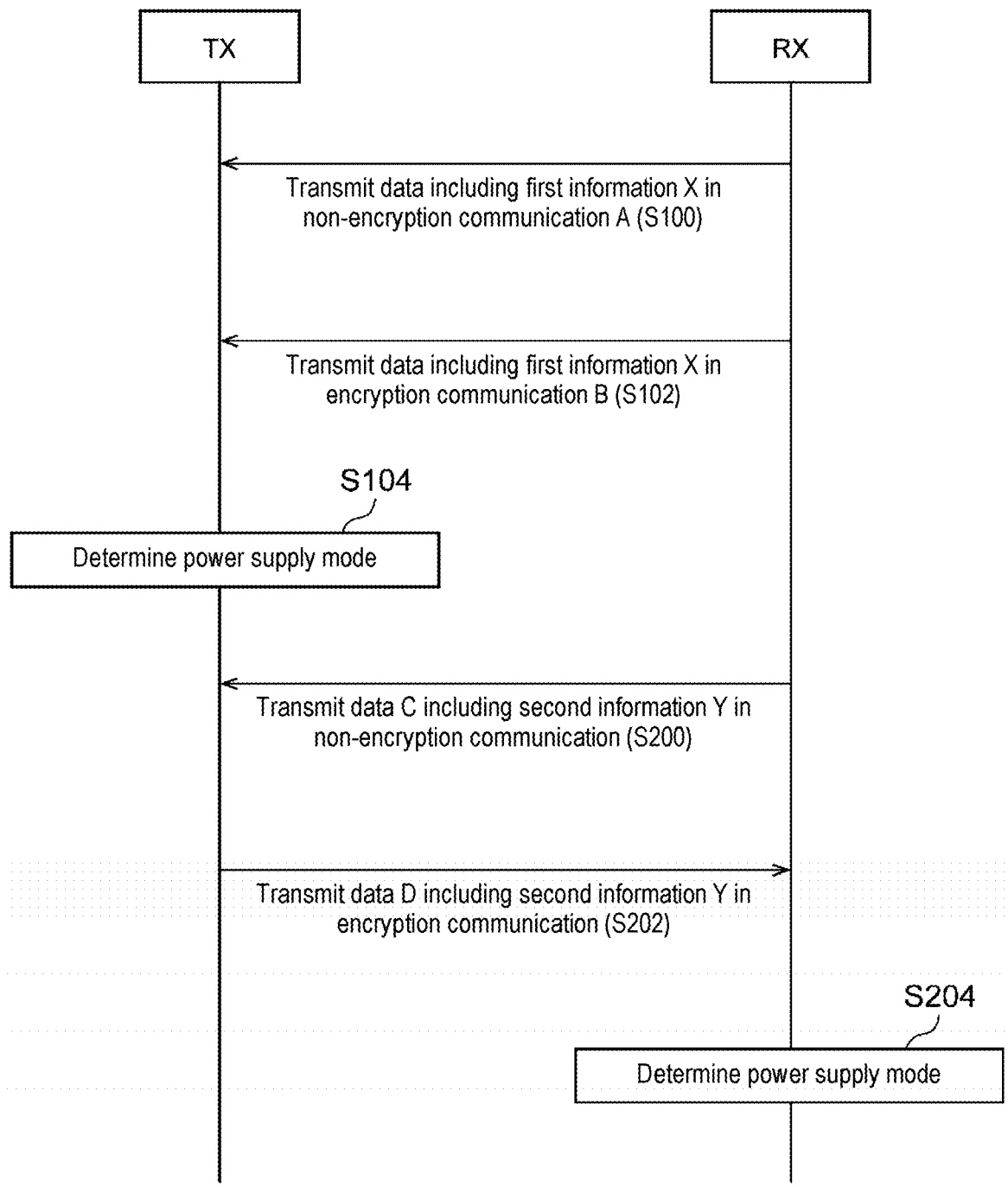
FIG. 12 is a flowchart of mode control of a wireless power supply system according to a third embodiment.

The first embodiment and the second embodiment may be combined. FIG. 12 is a flowchart of mode control of a power supply system 100 according to a third embodiment. Each step is the same as in FIG. 2 and FIG. 7.

Figure 13:
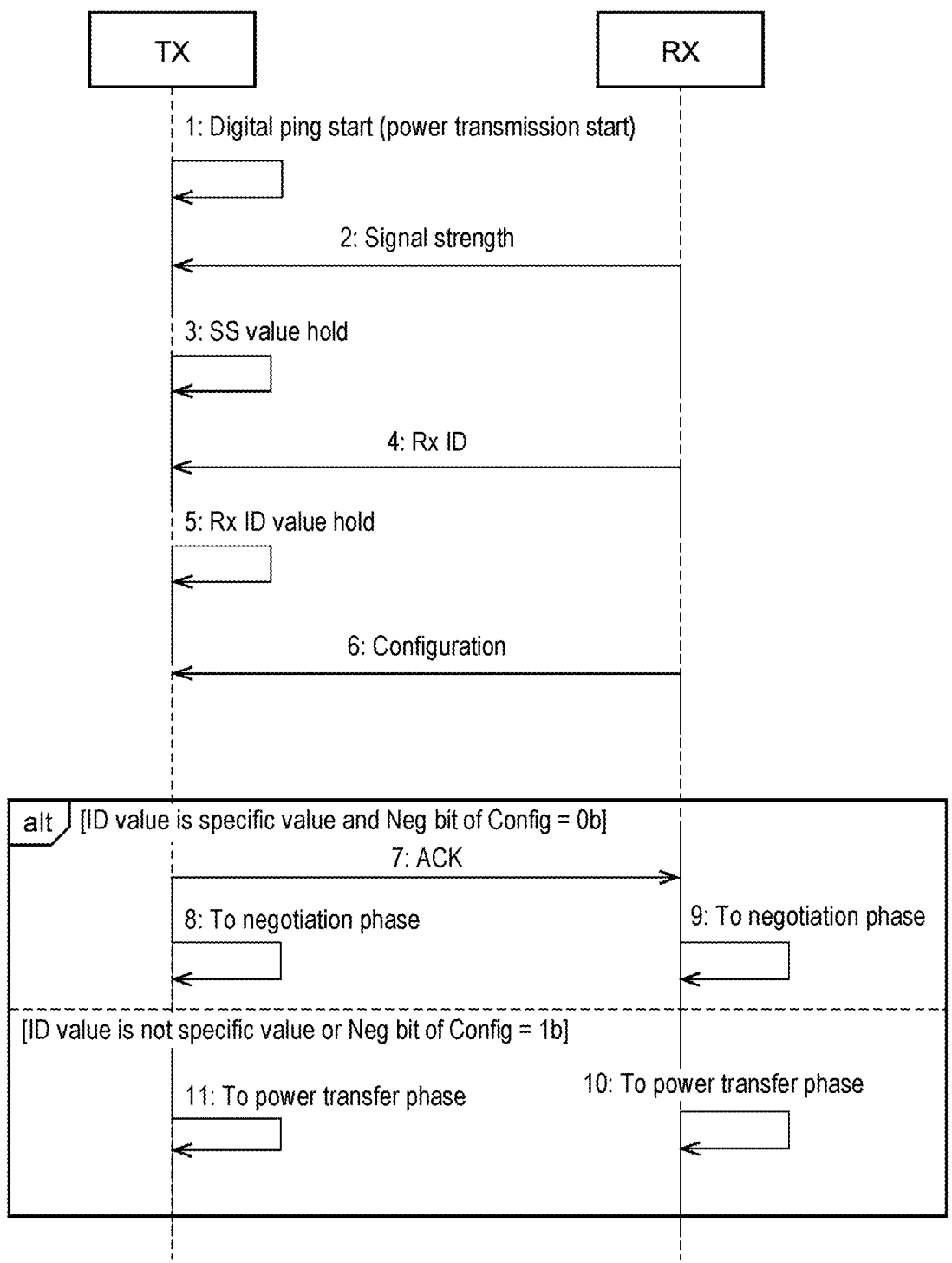
FIG. 13 is a sequence diagram of mode control according to the third embodiment.

The mode control according to the third embodiment will be described in detail. FIG. 13 to FIG. 16 are sequence diagrams of the mode control according to the third embodiment. FIG. 13 shows a Digital Ping phase and an Identification & Configuration phase.

Digital Ping starts (1). An SS value is transmitted from the first device RX to the second device TX (2). The SS value corresponds to the second information Y, and (2) corresponds to S200 in FIG. 7. The SS value is held in a memory in the second device TX (3).

Next, the sequence proceeds to the Identification & Configuration phase. The first device RX transmits RxID to the second device TX (4). RxID corresponds to the first information X, and (4) corresponds to S100 in FIG. 2. RxID is held in a memory in the second device TX (5).

Subsequently, configuration data is transmitted from the first device RX to the second device TX (6). The value of Neg bit is set to 0b.

When an ID value is a specific value and Neg bit=0b, an acknowledgement ACK is returned (7), and the sequence proceeds to a negotiation phase (8, 9).

When the ID value is not a specific value or Neg bit≠0b, a BPP mode (second power supply mode) is selected and the sequence proceeds to a power transfer phase (10, 11).

Figure 14:
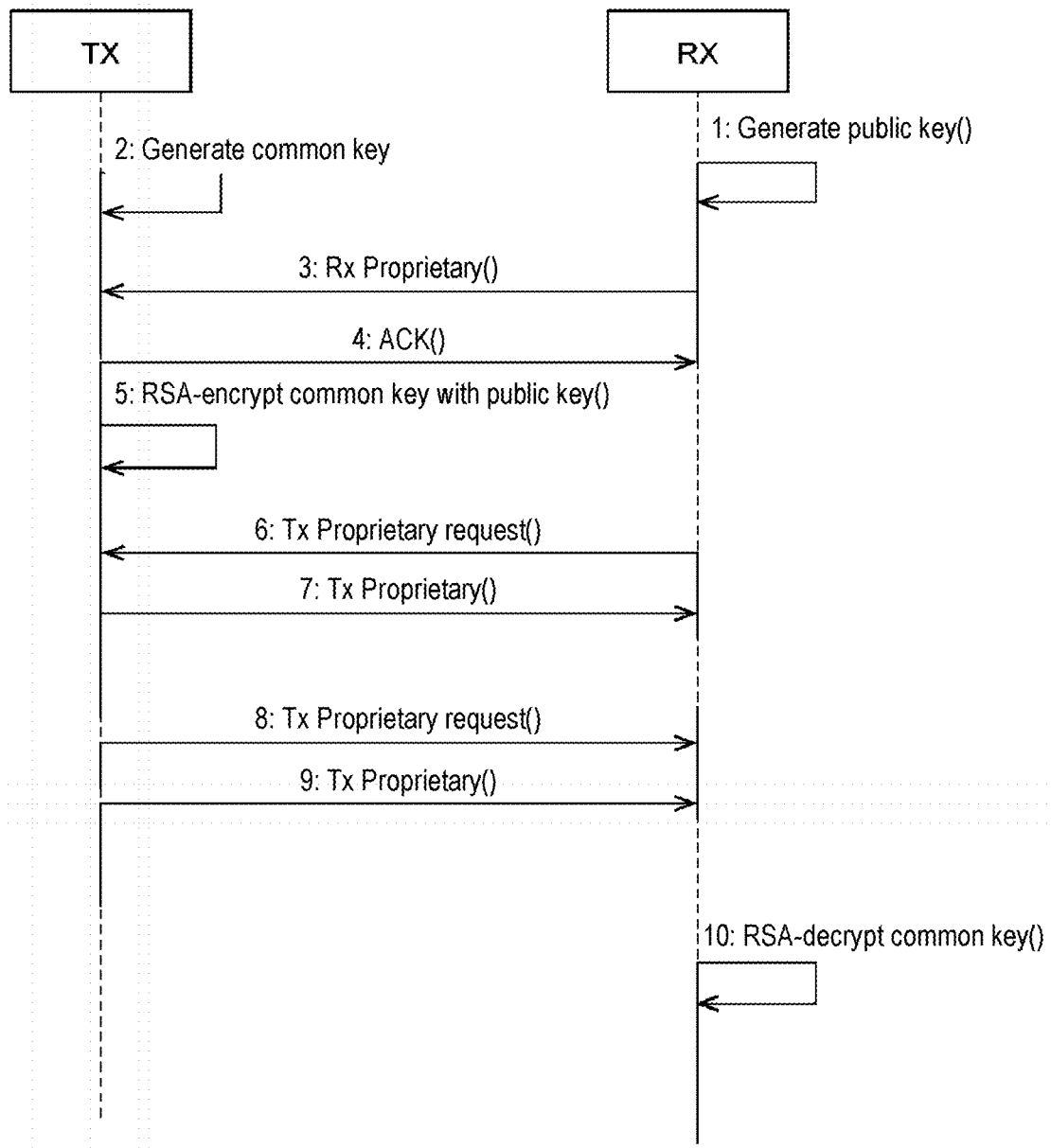
FIG. 14 is a sequence diagram of mode control according to the third embodiment.

Referring to FIG. 14, a private key and a public key are generated in the first device RX (1, S122 in FIG. 4 and S222 in FIG. 9). The private key/public key pair is used for RSA authentication and is, for example, 16 bytes.

A common key is generated in the second device TX (2, S120 in FIG. 4 and S220 in FIG. 9). The common key is used for AES authentication and is, for example, 16 bytes.

Using an Rx Proprietary packet, the public key is transmitted from the first device RX to the second device TX (3, S224 in FIG. 9), and an acknowledgement ACK is returned (4).

The second device TX uses the public key to RSA-encrypt the common key (5). This corresponds to the second data described above.

The first device RX transmits a request for a Tx Proprietary packet (6), and the Tx Proprietary packet is returned (7). Subsequently, the first device RX transmits a request for Tx Proprietary (8), and the Tx Proprietary packet is returned (9). In (7) and (9), the first 9 bytes and the remaining 7 bytes of the second data are divided and transmitted (S128 in FIG. 4 and S228 in FIG. 9).

The second data is RSA-decrypted in the first device RX (10). As a result, the first device RX obtains the common key (S130 in FIG. 4 and S230 in FIG. 9).

Figure 15:
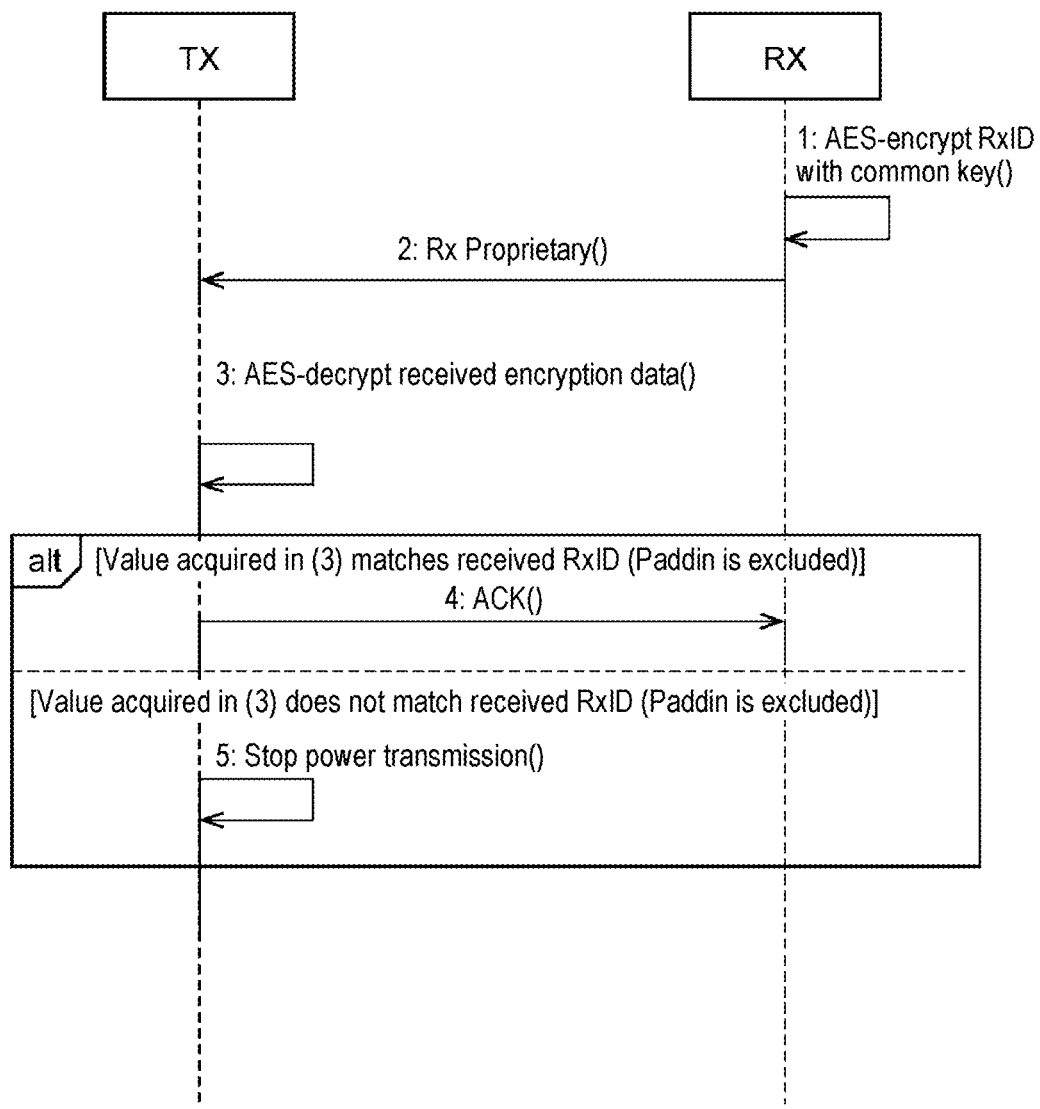
FIG. 15 is a sequence diagram of mode control according to the third embodiment.

Referring to FIG. 15, in the first device RX, RxID (first information) is AES-encrypted (1). The encrypted data is transmitted to the second device TX as an Rx Proprietary packet (corresponding to the third data) (2). This corresponds to S134 in FIG. 4.

The second device TX AES-decrypts the received data (3). This corresponds to S136 in FIG. 4. Then, the data acquired in (3) is compared with the received RxID (S114 in FIG. 3). When they match, an acknowledgement is returned (4). When they do not match, power transmission is stopped (5).

Figure 16:
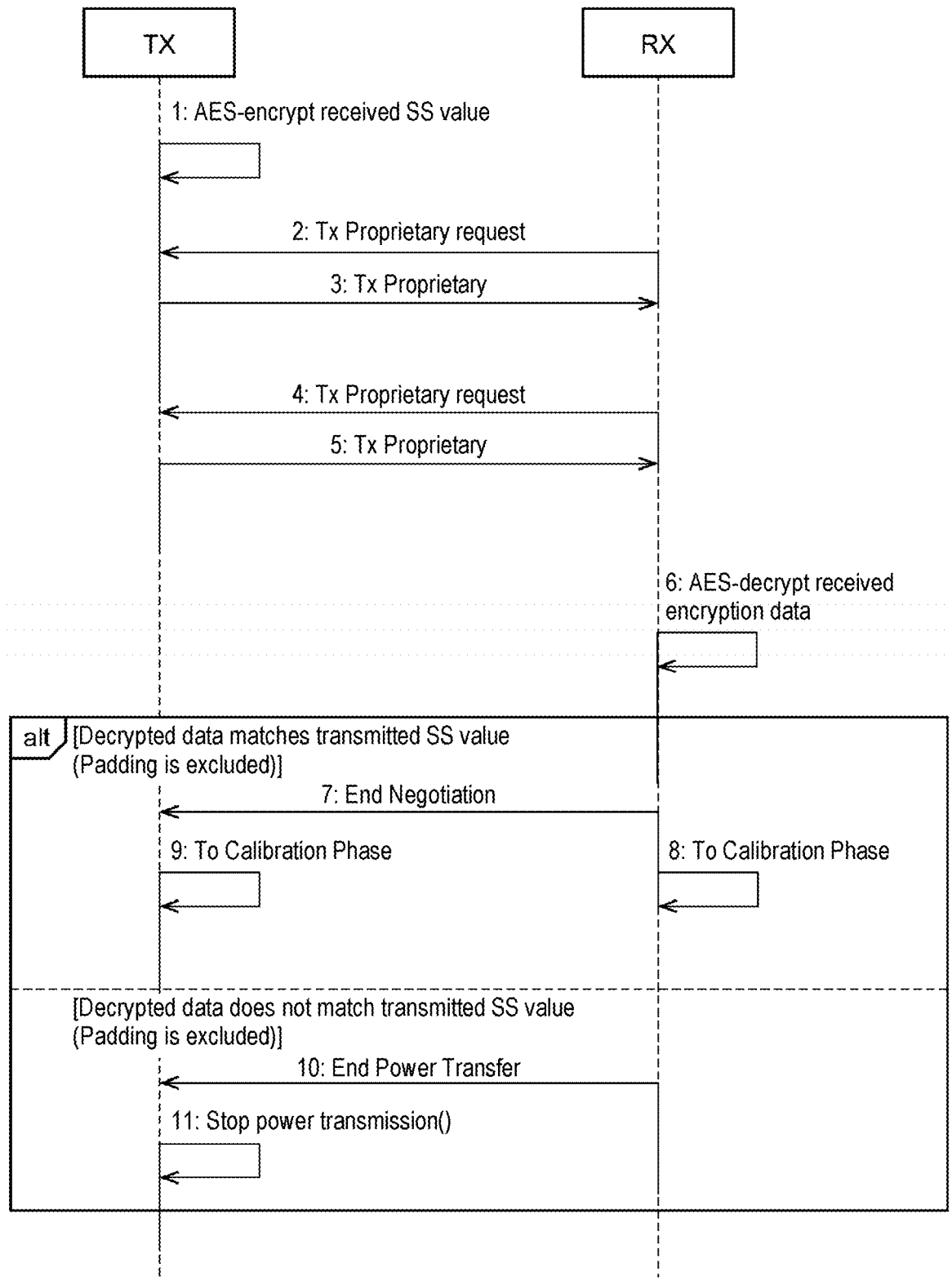
FIG. 16 is a sequence diagram of mode control according to the third embodiment.

Referring to FIG. 16, in the second device TX, the received SS value (second information) is AES-encrypted (1, S232 in FIG. 9). As a result, the above-mentioned third data D3 is generated. The first device RX transmits a request for a Tx Proprietary packet (2), and the Tx Proprietary packet is returned (3). Subsequently, the first device RX transmits a request for Tx Proprietary (4), and the Tx Proprietary packet is returned (5). In (3) and (5), the first 9 bytes and the remaining 7 bytes of the third data D3 are divided and transmitted.

The first device RX AES-decrypts the received data (6, S236 in FIG. 9).

The first device RX compares the data acquired in (6) with the received SS value (S212 in FIG. 8). When they match, an End Negotiation message is transmitted (7), the first device RX and the second device TX proceed to a calibration phase (8, 9).

When the data acquired in (6) does not match the received SS value, an End Power Transfer message is transmitted (10), and the second device TX stops the power transmission (11).

The present disclosure has been described above by way of embodiments. The disclosed embodiments are illustrative only. It should be understood by those skilled in the art that various modifications to combinations of elements or processes may be made and such modifications fall within the scope of the present disclosure. Such modifications will be described below.

In the embodiments, RxID is used as the first information and an SS value is used as the second information. However, an SS value may be used as the first information, and RxID may be used as the second information. Alternatively, random values may be used as the first information and the second information. In this case, the first information and the second information may be transmitted using a Proprietary packet after the Digital Ping phase.

In the first to third embodiments, an aspect in which the first device is replaced with a power transmitting device and the second device is replaced with a power receiving device is also included in the scope of the present disclosure.

Although the present disclosure has been described using specific terms based on the embodiments, the embodiments only illustrate the principles and applications of the present disclosure. Many modifications and changes of arrangement can be made without departing from the spirit of the present disclosure defined in the claims.

According to the present disclosure in some embodiments, it is possible to provide a wireless power supply system with improved safety.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method for controlling a wireless power supply system including a wireless power transmitting device and a wireless power receiving device, comprising:
    transmitting predetermined first information by non-encryption communication from a first device, which is one of the wireless power receiving device and the wireless power transmitting device, to a second device, which is the other of the wireless power receiving device and the wireless power transmitting device;
    transmitting the first information by encryption communication from the first device to the second device; and
    prohibiting, in the second device, a specific power supply mode when the first information received by the non-encryption communication does not match the first information received by the encryption communication,
    wherein the act of transmitting the first information by the encryption communication includes:
    transmitting, by the first device, first data including a public key to the second device;
    receiving, by the second device, the first data and acquiring the public key;
    generating, by the second device, a common key, generating, by the second device, second data by using the public key to encrypt the common key, and transmitting, by the second device, the second data to the first device;
    receiving, by the first device, the second data and acquiring the common key by using a private key corresponding to the public key to decrypt the second data;
    generating, by the first device, third data by using the common key to encrypt the first information, and transmitting, by the first device, the third data to the second device; and
    decrypting, by the second device, the third data by using the common key, and acquiring, by the second device, the first information.

2. The method of claim 1, wherein the first device is the wireless power receiving device, and the second device is the wireless power transmitting device.

3. The method of claim 2, wherein the first information is information that is specified in a Qi standard to be transmitted from the wireless power receiving device to the wireless power transmitting device.

4. The method of claim 3, wherein the first information is an ID unique to the first device.

5. The method of claim 1, further comprising:
    transmitting predetermined second information by non-encryption communication from the first device to the second device;
    transmitting the second information by encryption communication from the second device to the first device; and
    prohibiting, in the first device, the specific power supply mode when the second information transmitted by the non-encryption communication does not match the second information received by the encryption communication.

6. The method of claim 1, further comprising:
transmitting predetermined second information from the first device to the second device;
generating, by the second device, fourth data by using the common key to encrypt the second information, and transmitting, by the second device, the fourth data to the first device;
decrypting by the first device, the fourth data by using the common key, and acquiring by the first device, the second information; and
prohibiting, in the first device, the specific power supply mode when the transmitted second information does not match the received second information.

7. The method of claim 6, wherein the first device is the wireless power receiving device, and the second device is the wireless power transmitting device, and
wherein the second information is information that is specified in a Qi standard to be transmitted from the wireless power receiving device to the wireless power transmitting device.

8. The method of claim 7, wherein the second information is an SS (Signal Strength) value.

9. A power transmission controller used in a wireless power transmitting device that transmits a power signal to a wireless power receiving device, wherein a protocol defined in a Qi standard is used to facilitate encryption communication, and a specific power supply mode is prohibited when information received from the wireless power receiving device using the encryption communication does not match an expected value,
wherein the power transmission controller is configured to:
receive first information by non-encryption communication from the wireless power receiving device;
receive the first information by the encryption communication from the wireless power receiving device;
receive first data including a public key from the wireless power receiving device;
generate a common key, generate second data by using the public key to encrypt the common key, and transmit the second data to the wireless power receiving device;
receive third data including the first information encrypted using the common key from the wireless power receiving device; and
decrypt the third data by using the common key and acquire the first information, and
wherein the specific power supply mode is prohibited when the first information received by the non-encryption communication does not match the first information received by the encryption communication.

10. The power transmission controller of claim 9, further configured to:
receive predetermined second information by non-encryption communication from the wireless power receiving device; and
generate fourth data by using the common key to encrypt the second information, and transmit the fourth data to the wireless power receiving device.

11. A method for controlling a wireless power supply system including a wireless power transmitting device and a wireless power receiving device, comprising:
transmitting predetermined information by non-encryption communication from a first device, which is one of the wireless power receiving device and the wireless power transmitting device, to a second device, which is the other of the wireless power receiving device and the wireless power transmitting device;
transmitting the predetermined information by encryption communication from the second device to the first device; and
prohibiting, in the first device, a specific power supply mode when the predetermined information transmitted by the non-encryption communication does not match the predetermined information received by the encryption communication,
wherein the act of transmitting the predetermined information by the encryption communication includes:
transmitting, by the first device, first data including a public key to the second device;
receiving, by the second device, the first data and acquiring the public key;
generating, by the second device, a common key, generating, by the second device, second data by using the public key to encrypt the common key, and transmitting, by the second device, the second data to the first device;
receiving, by the first device, the second data and acquiring the common key by using a private key corresponding to the public key to decrypt the second data;
generating, by the second device, third data by using the common key to encrypt the predetermined information, and transmitting, by the second device, the third data to the second device; and
decrypting, by the first device, the third data by using the common key, and acquiring, by the first device, the predetermined information.

12. The method of claim 11, wherein the first device is the wireless power receiving device, and the second device is the wireless power transmitting device.

13. The method of claim 11, wherein the predetermined information is an SS (Signal Strength) value.

14. A power reception controller used in a wireless power receiving device that receives a power signal from a wireless power transmitting device, wherein a protocol defined in a Qi standard is used to facilitate encryption communication, and a specific power supply mode is prohibited when information received from the wireless power receiving device using the encryption communication does not match an expected value,
wherein the power reception controller is configured to:
transmit predetermined information by non-encryption communication to the wireless power transmitting device;
receive the predetermined information by the encryption communication from the wireless power transmitting device;
transmit first data including a public key to the wireless power transmitting device;
receive, from the wireless power transmitting device, second data obtained by using the public key to encrypt a common key;
acquire the common key by using a private key corresponding to the public key to decrypt the second data;
receive, from the wireless power transmitting device, third data obtained by using the common key to encrypt the predetermined information; and
decrypt the third data by using the common key and acquire the predetermined information, and
wherein the specific power supply mode is prohibited when the predetermined information transmitted by the non-encryption communication does not match the predetermined information received by the encryption communication.

15. The power reception controller of claim 14, wherein the predetermined information is an SS (Signal Strength) value.

* * * * *